(12) United States Patent
El Defrawy et al.

(10) Patent No.: US 10,198,584 B2
(45) Date of Patent: Feb. 5, 2019

(54) NON-MALLEABLE OBFUSCATOR FOR SPARSE FUNCTIONS

(71) Applicant: HRL Laboratories, LLC, Malibu, CA (US)

(72) Inventors: Karim El Defrawy, Santa Monica, CA (US); Chongwon Cho, Los Angeles, CA (US); Daniel C. Apon, College Park, MD (US); Jonathan Katz, College Park, MD (US)

(73) Assignee: HRL Laboratories, LLC, Malibu, CA (US)

( * ) Notice: Subject to any disclaimer, the term of this patent is extended or adjusted under 35 U.S.C. 154(b) by 187 days.

(21) Appl. No.: 15/091,541

(22) Filed: Apr. 5, 2016

(65) Prior Publication Data

US 2017/0316214 A1 Nov. 2, 2017

Related U.S. Application Data

(60) Provisional application No. 62/190,435, filed on Jul. 9, 2015.

(51) Int. Cl.
*G06F 21/60* (2013.01)
*G06F 21/14* (2013.01)

(52) U.S. Cl.
CPC .............. *G06F 21/60* (2013.01); *G06F 21/14* (2013.01); *H04L 2209/16* (2013.01)

(58) Field of Classification Search
CPC ....................................................... G06F 21/60
See application file for complete search history.

(56) References Cited

U.S. PATENT DOCUMENTS

| 2006/0140401 A1* | 6/2006 | Johnson | G06F 21/14 380/44 |
| 2008/0059624 A1* | 3/2008 | Groz | G06Q 40/04 709/223 |
| 2009/0307500 A1 | 12/2009 | Sato et al. | |
| 2016/0006541 A1* | 1/2016 | Eftekhari | G11B 20/00 714/776 |

OTHER PUBLICATIONS

Hoeteck Wee, "On obfuscating point functions", pp. 523-532, Proceedings of the thirty-seventh annual ACM symposium on Theory of Computing, 2005. (Year: 2005).*

(Continued)

*Primary Examiner* — Eleni A Shiferaw
*Assistant Examiner* — Hee K Song
(74) *Attorney, Agent, or Firm* — Tope-McKay & Associates

(57) ABSTRACT

Described is a system for obfuscating a computer program. Sensitive data of an unprotected computer program is received as input. A random oracle is used to algebraically hide a set of polynomial-size point functions representing the sensitive data. The system outputs a set of obfuscated instructions internally hiding the sensitive data. The set of obfuscated instructions are used to transform the unprotected computer program into a protected, obfuscated computer program that is accepting of the set of polynomial-size point functions. The obfuscated computer program is written to a non-volatile computer-readable medium.

18 Claims, 3 Drawing Sheets

(56) References Cited

OTHER PUBLICATIONS

Notification of Transmittal of International Search Report and the Written Opinion of the International Searching Authority for PCT/US2016/026072; dated Jul. 26, 2016.
International Search Report of the International Searching Authority for PCT/US2016/026072; dated Jul. 26, 2016.
The Written Opinion of the International Searching Authority for PCT/US2016/026072; dated Jul. 26, 2016.
Shafi Goldwasser et al., 'On Best-Possible Obfuscation', In: proceedings of the 4th Theory of Cryptography Conference (TCC 2007), LNCS 4392, pp. 194-213, Feb. 21-24, 2007.
Ran Canetti et al., 'Non-malleable Obfuscation', In: proceedings of the 6th Theory of Cryptography Conference (TCC 2009), LNCS 5444, pp. 73-90, Mar. 15-17, 2009.
Zvika Brakerski et al., 'Obfuscating Conjunctions', In: proceedings of the 33rd Annual Cryptology Conference (CRYPTO 2013), Part II, LNCS 8043, pp. 416-434, Aug. 18-22, 2013.
Ran Canetti et al., 'Obfuscating Point Functions with Multibit Output', In: proceedings of the 27th Annual International Conference on the Theory and Applications of Cryptographic Techniques (EUROCRYPT 2008), LNCS 4965, pp. 489-508, Apr. 13-17, 2008.
Ran Canetti and Mayank Varia 2009 Non-malleable Obfuscation. In Proceedings of the 6th Theory of Cryptography Conference on Theory of Cryptography (TCC '09), Omer Reingold (Ed.). Springer-Verlag, Berlin, Heidelberg, pp. 73-90.
Boaz Barak, Oded Goldreich, Russell Impagliazzo, Steven Rudich, Amit Sahai, Salil P. Vadhan, and Ke Yang. On the (im)possibility of obfuscating programs. In Joe, Kilian, editor, Advances in Cryptology—Crypto 2001 vol. 2139 of Lecture Notes in Computer Science, pp. 1-18, Santa Barbara, CA, USA, Aug. 19-23, 2001. Springer.
Hoeteck Wee. On obfuscating point functions. In Harold N. Gabor and Ronald Fagin editors, 37th Annual ACM Symposium on Theory of Computing, pp. 523-532, Baltimore, Maryland, USA, May 22-24, 2005, ACM press.
Benjamin Lynn, Manoj Prabhakaran, and Amit Sahai. Positive results and techniques for obfuscation, Advances in Cryptology—Eurocrypt 2004, vol. 3027 of Lecture Notes in Computer Science, pp. 20-39, Interlaken, Switzerland, May 2-6, 2004. Springer.
Shafi Goldwasser and Guy N. Rothblum. On best-possible obfuscation. In Salil P. Vadhan, editor, TCC 2007: 4th Theory of Cryptography Conference, vol. 4392 of Lecture Notes in Computer Science, pp. 194-213, Amsterdam, The Netherlands, Feb. 21-24, 2007. Springer.
Sanjam Gang, Craig Gentry, Shai Halevi, Mariana Raykova, Amit Sahai, and Brent Waters, Candidate indistinguishability, obfuscation and functional encryption for all circuits. In 54th Annual Symposium on Foundations of Computer Science, pp. 40-49, Berkeley, CA. USA, Oct. 26-29, 2013. IEEE Computer Society Press.
Jonathan Katz, Yehuda Lindell, Chapter 7, pp. 243-296: Introduction to Modem Cryptography, 2007, Chapman & Hall/CRC.
Mihir Bellare and Phillip Rogaway, Random Oracles Are Practical: A Paradigm for Designing Efficient Protocols, Proceedings of the 1st ACM conference and Communication Security, CCS 93, pp. 62-73, 1993, ACM, New York, NY, USA.
Notification Concerning Transmittal of International Preliminary Report on Patentability for PCT/US2016/026072; dated Jan. 18, 2018.
International Preliminary Report on Patentability for PCT/US2016/026072; dated Jan. 18, 2018.

\* cited by examiner

US 10,198,584 B2

NON-MALLEABLE OBFUSCATOR FOR SPARSE FUNCTIONS

CROSS-REFERENCE TO RELATED APPLICATIONS

This is a Non-Provisional application of U.S. Provisional Application No. 62/190,435, filed in the United States on Jul. 9, 2015, entitled, "Non-Malleable Obfuscator for a Polynomial Set of Sparse Functions," which is incorporated herein by reference in its entirety.

BACKGROUND OF INVENTION

(1) Field of Invention

The present invention relates to a system for obfuscating a computer program and, more particularly, to a system for obfuscating a computer program containing any polynomial-size set of point functions to protect sensitive information in the computer program.

(2) Description of Related Art

In software development, obfuscation is the act of creating obfuscated code (i.e. source or machine code that is difficult for humans to understand). Programmers may deliberately obfuscate code to conceal its purpose or its logic, in order to prevent tampering, deter reverse engineering, or as a puzzle or recreational challenge for someone reading the source code. Programs known as obfuscators transform readable code into obfuscated code using various techniques. The following are prior art in obfuscation algorithms.

The work described in Literature Reference No. 1 (see the List of Incorporated Literature References as provided below) considers the notion of non-malleable cryptographic obfuscation. It provides the first construction of non-malleable obfuscation for the class of multi-point programs, which accepts a constant number of points from the input domain and obfuscates them using access to a Random Oracle (i.e., in the Random Oracle Model (ROM)).

Further, the work described in Literature Reference No. 2 considers the notion of cryptographic obfuscation. This work provides strong impossibility results of the strong notion of cryptographic obfuscation for general functions in the plain model (i.e., not in Random Oracle Model (ROM)). This work does not consider non-malleability.

Literature Reference No. 3 provides strong point obfuscation from strong pseudorandom functions with super-polynomial hardness in the plain model. Such a program is important because it represents password-based access control to other systems. However, the obfuscation is achieved only for the family of point functions where a point function associated with a secret value x takes a string x' as input and outputs 1 if x=x'; otherwise it outputs 0. A primary limitation of this work is that the system can handle only a single password rather than many.

Additionally, the work disclosed in Literature Reference No. 4 provides how to obfuscate some classes of functions in the ROM and achieve the obfuscations in a composable way. The work considers the obfuscation for the class of graph access functions which are more generic that point functions, but it does not consider non-malleability of the obfuscation.

Literature Reference No. 5 considers the obfuscation of polynomial ordered bounded decision diagrams (POBDDs) in the weaker notion of obfuscation, referred to as Indistinguishability Obfuscation (iO). A POBDD is used as an acyclic graph with vertices and edges representing variables and binary values, respectively. iO does not guarantee the protection of sensitive information of the circuit.

Finally, Literature Reference No. 6 provides a general purpose obfuscation for all polynomial-size circuit in the notion of iO, which satisfies a weaker form of security under the cryptographic multi-linear encoding. Due to the underlying building block, the obfuscation scheme is impractical because even to obfuscate a simple program, the size of the obfuscated program is too large to be deployed in practice. For example, an obfuscated program for a 16 bit string equality test has 30 gigabytes (GB) and its execution time exceeds 30 minutes.

Thus, a continuing need exists for a non-malleable obfuscator for obfuscating a polynomial number of points rather than a constant number and also provides security according to a stronger notion of obfuscation than existing methods.

SUMMARY OF THE INVENTION

The present invention relates to a system for obfuscating a computer program and, more particularly, to a system for obfuscating a computer program containing any polynomial-size set of point functions to protect sensitive information in the computer program. The system comprises one or more processors and a non-transitory computer-readable medium having executable instructions encoded thereon such that when executed, the one or more processors perform multiple operations. The system receives, as input, sensitive data of an unprotected computer program P. A random oracle is used to algebraically hide a set of polynomial-size point functions representing the sensitive data. A set of obfuscated instructions internally hiding the sensitive data is output. The set of obfuscated instructions are used to transform the unprotected computer program P into a protected, obfuscated computer program P' that is accepting of the set of polynomial-size point functions. The obfuscated computer program P' is written to a non-volatile computer-readable medium.

A random oracle is used to algebraically hide a set of polynomial-size point functions of a computer program P, resulting in an obfuscated computer program P' that is accepting of the set of polynomial-size point functions. The set of polynomial-size point functions comprise sensitive information, and the obfuscated computer program P' is not vulnerable to an adversary.

In another aspect, an adversary is prevented from learning the set of polynomial-size point functions.

In another aspect, an adversary is prevented from modifying the obfuscated computer program P' to another re-obfuscated computer program.

In another aspect, the obfuscated computer program P' is evaluated with an input, wherein if the input is one of the set of polynomial-size point functions, then the obfuscated computer program P' will be evaluated to output 1, and 0 otherwise.

In another aspect, the present invention also comprises a method for causing a processor to perform the operations described herein.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
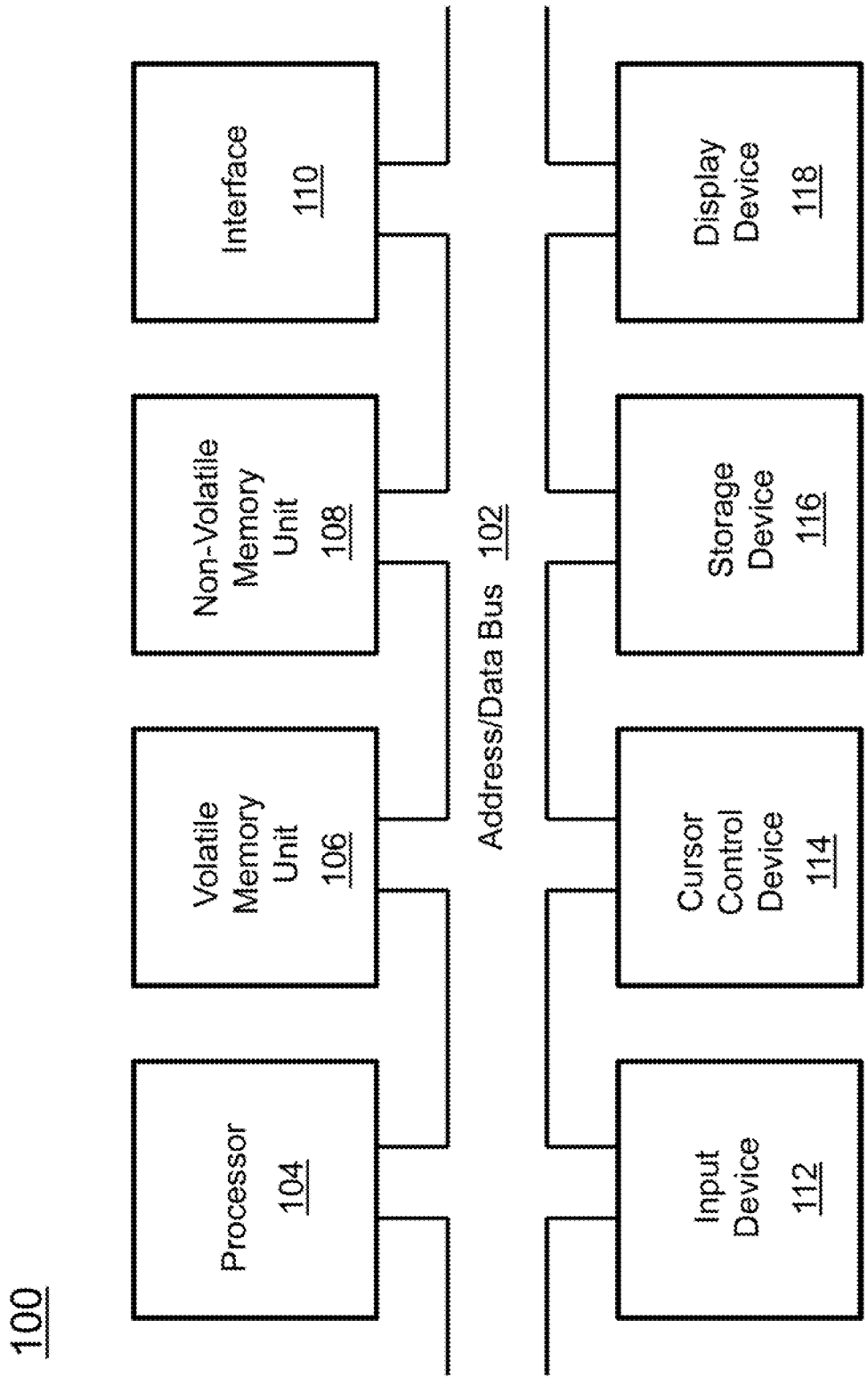
FIG. 1 is a block diagram depicting the components of a system for obfuscating a computer program according to embodiments of the present invention.

The present invention relates to a system for obfuscating a computer program and, more particularly, to a system for obfuscating a computer program containing any polynomial-size set of point functions to protect sensitive information in the computer program. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of cited literature references used in the description is provided. Next, a description of various principal aspects of the present invention is provided. Following that is an introduction that provides an overview of the present invention. Finally, specific details of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully included herein. The references are cited in the application by referring to the corresponding literature reference number, as follows:

1. Ran Canetti and Mayank Varia. 2009. Non-malleable Obfuscation. In Proceedings of the 6th Theory of Cryptography Conference on Theory of Cryptography (TCC '09), Omer Reingold (Ed.). Springer-Verlag, Berlin, Heidelberg, 73-90.
2. Boaz Barak, et al. On the (im)possibility of obfuscating programs. In Joe, Kilian, editor, Advances in Cryptology—Crypto 2001, volume 2139 of Lecture Notes in Computer Science, pages 1-18, Santa Barbara, Calif., USA, Aug. 19-23, 2001. Springer.
3. Hoeteck Wee. On obfuscating point functions. In Harold N. Gabow and Ronald Fagin, editors, $37^{th}$ Annual ACM Symposium on Theory of Computing, pages 523-532, Baltimore, Md., USA, May 22-24, 2005. ACM press.
4. Benjamin Lynn, et al. Positive results and techniques for obfuscation, Advances in Cryptology—Eurocrypt 2004, volume 3027 of Lecture Notes in Computer Science, pages 20-39, Interlaken, Switzerland, May 2-6, 2004. Springer.
5. Shafi Goldwasser and Guy N. Rothblum. On best-possible obfuscation. In Salil P. Vadhan, editor, TCC 2007: $4^{th}$ Theory of Cryptography Conference, volume 4392 of Lecture Notes in Computer Science, pages 194-213, Amsterdam, The Netherlands, Feb. 21-24, 2007. Springer.
6. Sanjam Garg, et al. Candidate indistinguishability obfuscation and functional encryption for all circuits. In $54^{th}$ Annual Symposium on Foundations of Computer Science, pages 40-49, Berkeley, Calif., USA, Oct. 26-29, 2013. IEEE Computer Society Press.
7. Jonathan Katz, Yehuda Lindell, Chapter 7: Introduction to Modern Cryptography, 2007, Chapman & Hall/CRC.
8. Mihir Bellare and Phillip Rogaway, Random Oracles Are Practical: A Paradigm for Designing Efficient Protocols, Proceedings of the $1^{st}$ ACM conference and Communication Security, CCS 93, page 62-73, 1993, ACM, New York, N.Y., USA.

(2) Principal Aspects

Various embodiments have three "principal" aspects. The first is a system for obfuscating a computer program. The system is typically in the form of a computer system operating software or in the form of a "hard-coded" instruction set. This system may be incorporated into a wide variety of devices that provide different functionalities, such as a robot or other device. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
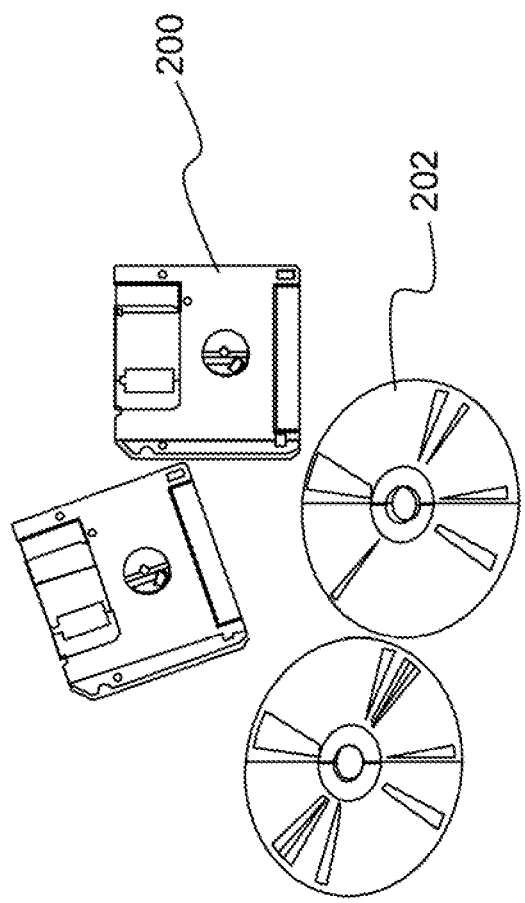
FIG. 2 is an illustration of a computer program product according to embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction"

include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system to obfuscate a computer program (and evaluate the resulting obfuscated program) containing any polynomial-size set of point functions to protect the sensitive information in it from reverse engineering or tampering in the Random Oracle Model (ROM) (see Literature Reference No. 8 for a description of the ROM). The sensitive information is hardcoded in the set of point functions. In the ROM, a truly random source is assumed; such a source is typically instantiated with an implementation of an appropriate cryptographic hash function.

The present invention provides the following security and efficiency guarantees. One is a virtual black box guarantee, which means that given the obfuscated program as its input, no computationally efficient adversary can learn anything important about the sensitive information inside it, which is hardcoded in such point functions. A second guarantee is a non-malleability guarantee, which means that given the obfuscated program, no adversary can modify it to another re-obfuscated program, which is related to the original one. For instance, in the case of a program representing several point functions, an adversary cannot remove, add or edit points (or hidden secrets) to the obfuscated program.

The invention described herein is an obfuscation algorithm, called O, which non-malleably obfuscates all sparse functions, given access to a random oracle. Before describing the specific details of the present invention, a few key technical terms are defined to provide the reader with a general understanding of the intended meaning of the terms. The definitions provided below are not intended to convey the entire scope of each term. Rather, they are intended to supplement the rest of the specification in more accurately explaining the terms used.

Program Obfuscation: In general, a program obfuscator, Obf, is a type of program compiler, which takes as input some description of a program P and outputs a "scrambled"-but-functionally-equivalent program description P'.

The goal of cryptographic program obfuscation is to compile program code P into program code P' so that P' can still be executed (i.e., P' produces the same outputs per input as the program P does), but so that the program code P' is somehow rendered "unintelligible" to any (potentially malicious) entity that has a copy of P'. The "unintelligibility" property is proven based on a (hopefully, typical) cryptographic hardness assumption, like the intractability of factoring or finding (perhaps multi-linear) discrete logarithms. Different types of obfuscators provide different, concrete security guarantees.

The goal of non-malleable obfuscation is to compile programs P into obfuscated programs P', so that no efficient attacker A, who holds a copy of the obfuscated program P', is able to maul the program P' into a functionally-distinct-but-related program P*. (A formal definition is given in Literature Reference No. 1)

Sparse Functions: A sparse function family $\{F_n\}$ is any set of (polynomial-time computable) functions $F_n: \{0,1\}^n \to \{0,1\}^m$ (for any positive integers n, m) where, specifically, there exists a polynomial $p=p(n)$, so that for all positive integers n, each function $F_n$ in the family outputs a non-zero value on at most $p(n)$ inputs x in $\{0,1\}^n$. → denotes a mapping function, and $F_n$ denotes a function to be obfuscated.

For example, the "password-checking function" (family), which (for each n) takes as input a password-attempt x in $\{0,1\}^n$, compares it against a list of passwords PW, and outputs 1 if x is in PW, and 0 otherwise, is a sparse function (family) when the size of the set PW is bounded by a fixed polynomial $p=p(n)$ for all password-lengths n. For this family, the output-length $m=1$, but this does not have to be the case in general.

This sparse function family also provides a good illustration of the security notion guaranteed by a non-malleable obfuscation of a program that implements password checking. Suppose an attacker receives a copy of the obfuscated program $O(F_{PW})$, where O is the obfuscation algorithm according to various embodiments of the present invention and $F_{\{PW,n\}}$ is a function that takes as input an n-bit string (for some known integer n), checks if the string is in a hidden list PW, and then outputs Yes (1) or No (0).

Now suppose the attacker wishes to maul the program $O(F_{PW})$ by either (maliciously) deleting one of the passwords in the password-checking program (or perhaps adding a new hidden password to PW that only the attacker/adversary knows). The security property guaranteed by the non-malleable obfuscation algorithm O is that the code $O(F_{PW})$ acts like a "house of cards" in the sense that any such attempted alteration to the program will totally destroy all hidden information in $O(F_{PW})$, namely, the list PW. In other words, the attacker A may be able to produce a "similar-looking program" code P* that in fact embeds his desired point x*, but the remaining passwords in the mauled program P* will have no discernable relationship or correlation with the original, honest list of passwords PW. Thus, in this sense, the program $O(F_{PW})$ is "non-malleable." The algorithm O, in fact, produces a similar security guarantee for any sparse function family, not just the password-checker family.

Point circuits: Formally, the obfuscation algorithm according to various embodiments of the present invention takes as input the description of a "plaintext p(n)-point circuit" $I_{\{y_1, \ldots, y_{p(n)}\}}$ for hidden points $y_1$ in $\{0,1\}^n$ and an arbitrary polynomial $p=p(n)$. The Boolean p(n)-point circuit $I_{\{y_1, \ldots, y_{p(n)}\}}$ itself may take as input an n-bit string x, then it checks if $x=y_i$ for $i=1 \ldots p(n)$, then outputs 1 if x is in the list, and 0 otherwise.

This already directly captures the notion of sparse Boolean (i.e., 0/1-valued-output) functions, but it was observed that a simple "encoding trick" allows one to obfuscate "general sparse functions" (i.e., sparse functions that may output a bit-string on at most $p(n)$ inputs). Namely, for each input $y_1$ on which the function outputs a string s (the string s that is output may differ between distinct inputs $y_1, y_j$), an associated set of inputs $y_{\{i,j\}}, \ldots, y_{\{i,s\}}$ is defined as $y_{\{i,j\}}=y_{i|j}$ for $j=1 \ldots s$, with each $y_{\{i,j\}}$ of bit-length at most $n+\log_{2(s)+1}$, where s is the bit-length of the string m. The idea is that the Boolean point circuit $I_{\{y_{1,1}, \ldots, y_{\{1,s\}}, \ldots, y_{\{p(n),1\}}, \ldots, y_{\{p(n),s\}}\}}$ (on $n+\log_{2(s)+1}$ bit-inputs), corresponding to the general point circuit $I_{\{y_1 \to s_1, \ldots, y_{p(n)} \to s_{p(n)}\}}$, is the circuit, $I_{\{y_{1,1}, \ldots, y_{\{1,s\}}, \ldots, y_{\{p(n),1\}}, \ldots, y_{\{p(n),s\}}\}}$, when given $y_{\{i,j\}}$ as input, outputs the 0/1-bit $m_j$ of the string m to which point $y_i$ maps in the general circuit.

Therefore, any (general) sparse function may be obfuscated using the algorithm O by first encoding it as a Boolean point circuit, then running O.

(4) Specific Details of the Invention

Figure 3:
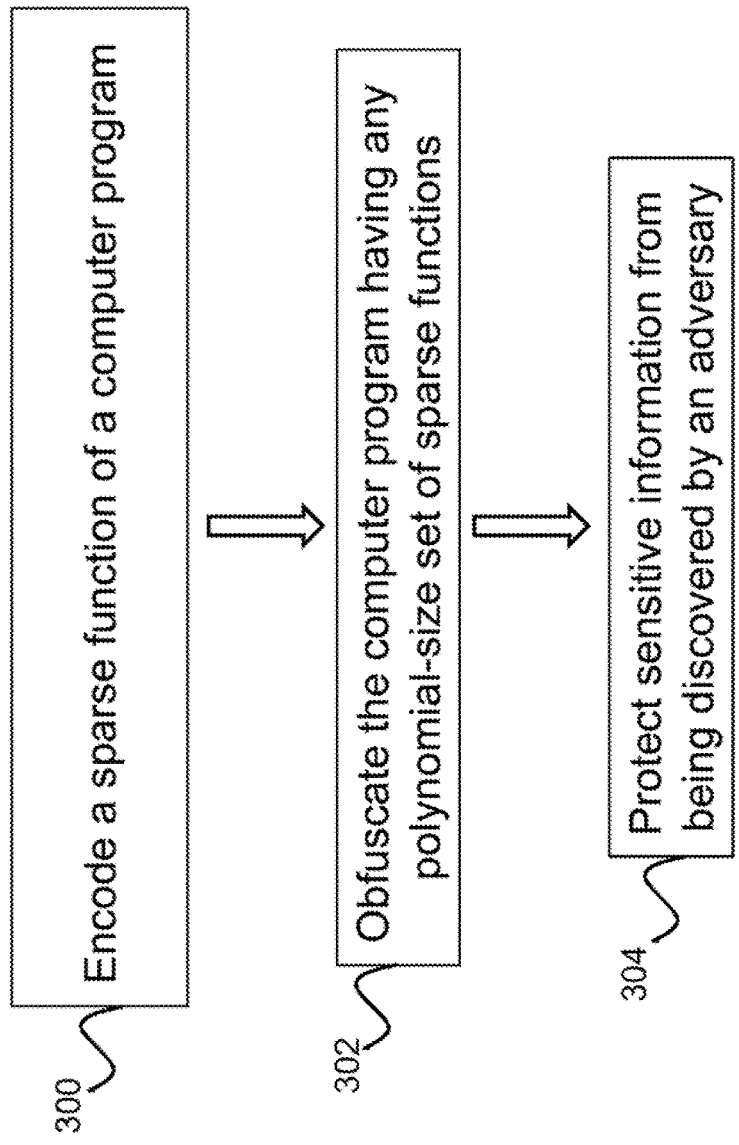
FIG. 3 is a flow diagram illustration operations of the system for obfuscating a computer program according to embodiments of the present invention.

Below is a description of the obfuscation algorithm O of the present invention. Its security will be based on the (plain) discrete logarithm described in Literature Reference No. 7, which is briefly described below for completeness. The full security proof is given in Literature Reference No. 8. A description of a sparse function of a computer program is provided above, which gives multiple secret polynomial points to be accepted by the program. Given the secret polynomial points, a random oracle is used to hide the points algebraically, resulting in an obfuscated program that is accepting of those points. A random oracle is an oracle that responds to every unique query with a random response chosen uniformly from its output domain. If a query is repeated, it responds the same way every time that query is submitted. Given the obfuscated program, no adversary can discover or modify sensitive information (i.e., secret points) from the obfuscated computer program. FIG. 3 is a flow diagram depicting operations performed by the system described herein. In a first operation 300, a sparse function of a computer program is encoded. In a second operation 302, a computer program having any polynomial-size set of sparse functions is obfuscated. In a third operation 304, sensitive information on the obfuscated program is protected from being discovered by an adversary.

The (plain) discrete logarithm assumption described in Literature Reference No. 7 is as follows: Let $(q, G, g) \leftarrow \text{Gen}(1^n)$ be a randomized algorithm that takes as input security parameter $1^n$, and outputs a tuple $(q, G, g)$, where q is a n-bit prime, G is (the description of) a multiplicative group of order q, and g is a uniformly chosen generator of G. $\leftarrow$ denotes that $(q, G, g)$ is the output of an algorithm Gen on input $1^n$, where $1^n$ is an unary representation of its security parameter (i.e., desired strength of security).

The discrete logarithm assumption states that for uniform $a \leftarrow F_q$ (for finite field $F_q$) and $h = g^a$, for any adversary A:
Pr[A(q, G, g, h)=a] is at most negligible in n.

The non-malleable obfuscator O for Boolean poly(n)-point circuits, in the random oracle model, is as follows:

Given oracle access to a random permutation H,

Input: for any (fixed) polynomial p: a cleartext p(n)-point circuit $I_{\{y_1, \ldots, y_{p(n)}\}}$ for $y_i$ in $\{0,1\}^n$ for all i 1. Extract the point $y_1, \ldots, y_{p(n)}$ from the description of $I_{\{y_1, \ldots, y_{p(n)}\}}$, and random permute the order of the $y_i$.
2. Sample a discrete logarithm instance $(q, G, g) \leftarrow \text{Gen}(1^{\{(2p(n)+1)n+n\}})$.
3. Sample vector $a=(a_1, \ldots, a_{p(n)}) \leftarrow (F_q)^{\{p(n)\}}$ uniformly.
4. Compute the group elements $g_1 := g^{\{a_1\}}, \ldots, g_{\{p(n)\}} := g^{\{a_n\}}$.
5. Sample uniform random coins $r \leftarrow \{0,1\}^{\{(2p(n)+1)n\}}$.
6. For all $j=1, \ldots, p(n)$, query the random oracle H to obtain $z_j := H(y_j \| r)$, where $\|$ denotes bit-string concatenation.
7. Interpret each bit-string $Z_j$ as an element $Z_j$ in $(F_q)^{\{p(n)\}}$ in any fixed, canonical manner.
8. Sample vector $v=(v_1, \ldots, v_{p(n)}) \leftarrow (F_q)^{\{p(n)\}}$ uniformly.
9. Set "zero-test parameter" $t := g_1^{\{v_1\}} x \ldots x(g_{p(n)})^{\{v_{p(n)}\}}$. In the present invention, the above function, for fixed $(q, G, g_1, \ldots, g_{p(n)})$, over inputs v is called the "generalized chameleon hash function."
10. Interpret each bit-string $y_j$ as an element of $F_q$, using the same (but arbitrary) canonical manner as above.
11. For all $j=1, \ldots, p(n)$, set $y_j = v + (y_j \times a^*)$ for any vector $a^*$ such that the inner product $\langle a, a^* \rangle = 0$. For example, vector $a^* = (a_2, -a_1, a_4, -a_3, \ldots a_{p(n)}, -a_{\{p(n)-1\}})$ works when p(n) is even.
12. In the finite field $F_q$, find the p(n)-many, unique degree-(p(n)-1) polynomials $P_1, \ldots, P_{p(n)}$, such that for all i,j in [p(n)], $P_{i(z_{\{i,j\}})} = y_{\{i,j\}}$, where one writes $z_j = (z_{\{1,j\}}, \ldots, z_{\{p(n);j\}})$ and similarly for the $y_j$.
13. Let P be the set of the $P_i$ for $i=1, \ldots, p(n)$.
14. Output the following tuple as the obfuscated program P' (which is functionally-equivalent to the input program $$I_{\{y_1, \ldots, y_{p(n)}\}} := (r, P, (q, G, g_1, \ldots, g_{p(n)}), t).$$

To evaluate any program of the form $(r, P, (q, G, g_1, \ldots, g_{p(n)}), t)$ on any n-bit input point x when additionally given oracle access (i.e. the ability to query) to the same random permutation H, proceed as follows:

1. Query the random oracle H to obtain $x^* := H(x\|r)$, for x' in $\{0,1\}^{\{(2p(n)+1)n+n\}}$.
2. Interpret $x^*$ as a vector u in $(F_q)^{\{p(n)\}}$ (in the same canonical fashion as in the construction above).
3. Compute the vector $u^* = (P_1(u_1), \ldots, P_{p(n)}(u_{p(n)}))$ in $(F_q)^{\{p(n)\}}$.
4. Evaluate the generalized chameleon hash function on $u^*$ to obtain an element $t^*$ in $F_q$. That is, compute the value $$t^* := (g_1)^{\{u_1^*\}} x \ldots x(g_{p(n)})^{\{u_{p(n)}^*\}}.$$

5. If $t = t^*$, output 1. Otherwise, output 0.

The present invention can be used to allow for the ability to obfuscate software executables that will allow them to keep adversaries from discovering sensitive information embedded in the software, particularly in the case of software that contains significant algorithmic intellectual property. In addition, obfuscated software is more difficult to corrupt because only the input/output behavior is known, preventing an adversary from further probing.

The described method transforms an unprotected (i.e., in the clear) access control program/software into a completely protected one (i.e., obfuscated software that is resistant to reverse engineering and analysis) that can be used as a subsystem or component in a larger computer system. In particular, consider the following real application example. A large private computer system (e.g., commercial servers, computing clusters of private companies, etc.) requires one to provide a password to gain a root access to it. Furthermore, there might exist many individuals who need a root access, each with a distinct password (e.g., system and network administrators or employees of a company). In such a case, one needs a software or hardware which internally and privately maintains a set of several passwords, one or more for each of the individuals, takes an input string from a person, checks whether the input string matches one of the internal passwords, and grants an access to the person if the input string is indeed one of the passwords and denies the access request otherwise.

The method described herein, referred to as an obfuscator, provides a way to protect and transform such password checking programs, along with the passwords, in an executable form. One can use the method O (obfuscator) described above, which takes as an input a set of passwords and outputs an executable software of access control, which is a set of obfuscated instructions internally hiding the passwords. This output is resistant to reverse engineering and analysis and does not reveal the passwords stored in it. Therefore, the input to O is a set of passwords in the form of a software or file containing them, and the output of O is a set of obfuscated instructions for a password checking program.

A large computer system can be deployed with this executable obfuscated software (i.e., a set of instructions) such that if a person requests an access to the system by providing a password (i.e., an input string), then the system first runs the executable obfuscated software on the password (e.g., an input to the obfuscated software). If the execution of the obfuscated software outputs 1, then the computer system grants an access to the person. Otherwise, the computer system denies the access.

The security guarantee is that even if an adversary intrudes into a computer system and obtains the obfuscated software, the adversary will not be able to find nor alter the passwords internally maintained by the obfuscated software. In other words, this obfuscated software is resistant to reverse engineering and analysis, is resistant to modifications without completely destroying its functionality, and does not reveal the passwords stored in it.

What is claimed is:

1. A system for obfuscating a computer program, the system comprising:
   one or more processors and a non-transitory computer-readable medium having executable instructions encoded thereon such that when executed, the one or more processors perform an operation of:
   receiving, as input, sensitive data of an unprotected computer program P, wherein the unprotected computer program P has any polynomial-size set of sparse functions, wherein a sparse function provides multiple secret polynomial points representing the sensitive data;
   using a random oracle to algebraically hide the secret polynomial points,
   outputting a set of obfuscated instructions internally hiding the sensitive data;
   using the set of obfuscated instructions to transform the unprotected computer program P into a protected, obfuscated computer program P' that is accepting of the secret polynomial points, wherein the set of obfuscated instructions non-malleably obfuscates all sparse functions, given access to the random oracle; and
   writing, by the one or more processors, the obfuscated computer program P' to a non-volatile computer-readable medium, wherein the obfuscated computer program provides a virtual black box guarantee, preventing an adversary from learning anything about the sensitive data.

2. The system as set forth in claim 1, wherein the one or more processors further perform an operation of preventing an adversary from learning the secret polynomial points.

3. The system as set forth in claim 2, wherein the one or more processors further perform an operation of preventing an adversary from modifying the obfuscated computer program P' to another re-obfuscated computer program.

4. The system as set forth in claim 3, wherein the one or more processors further perform an operation of evaluating the obfuscated computer program P' with an input, wherein if the input is one of the secret polynomial points, then the obfuscated computer program P' will be evaluated to output 1, and 0 otherwise.

5. The system as set forth in claim 1, wherein given the obfuscated computer program P', the one or more processors further perform an operation of preventing an adversary from modifying the obfuscated computer program P' to another re-obfuscated computer program.

6. The system as set forth in claim 1, wherein the one or more processors further perform an operation of evaluating the obfuscated computer program P' with an input, wherein if the input is one of the secret polynomial points, then the obfuscated computer program P' will be evaluated to output 1, and 0 otherwise.

7. A computer-implemented method for obfuscating a computer program, comprising:
   an act of causing one or more processors to execute instructions stored on a non-transitory memory such that upon execution, the one or more processors perform operations of:
   receiving, as input, sensitive data of an unprotected computer program P, wherein the unprotected computer program P has any polynomial-size set of sparse functions, wherein a sparse function provides multiple secret polynomial points representing the sensitive data;
   using a random oracle to algebraically hide the secret polynomial points,
   outputting a set of obfuscated instructions internally hiding the sensitive data;
   using the set of obfuscated instructions to transform the unprotected computer program P into a protected, obfuscated computer program P' that is accepting of the secret polynomial points, wherein the set of obfuscated instructions non-malleably obfuscates all sparse functions, given access to the random oracle; and
   writing, by the one or more processors, the obfuscated computer program P' to a non-volatile computer-readable medium, wherein the obfuscated computer program provides a virtual black box guarantee, preventing an adversary from learning anything about the sensitive data.

8. The method as set forth in claim 7, wherein the one or more processors further perform an operation of preventing an adversary from learning the secret polynomial points.

9. The method as set forth in claim 8, wherein the one or more processors further perform an operation of preventing an adversary from modifying the obfuscated computer program P' to another re-obfuscated computer program.

10. The method as set forth in claim 9, wherein the one or more processors further perform an operation of evaluating the obfuscated computer program P' with an input, wherein if the input is one of the secret polynomial points, then the obfuscated computer program P' will be evaluated to output 1, and 0 otherwise.

11. The method as set forth in claim 7, wherein given the obfuscated computer program P', the one or more processors further perform an operation of preventing an adversary from modifying the obfuscated computer program P' to another re-obfuscated computer program.

12. The method as set forth in claim 7, wherein the one or more processors further perform an operation of evaluating the obfuscated computer program P' with an input, wherein if the input is one of the secret polynomial points, then the obfuscated computer program P' will be evaluated to output 1, and 0 otherwise.

13. A computer program product for obfuscating a computer program, the computer program product comprising computer-readable instructions stored on a non-transitory computer-readable medium that are executable by a computer having one or more processors for causing the processor to perform operations of:
   receiving, as input, sensitive data of an unprotected computer program P, wherein the unprotected computer program P has any polynomial-size set of sparse functions, wherein a sparse function provides multiple secret polynomial points representing the sensitive data;

using a random oracle to algebraically hide the secret polynomial points, outputting a set of obfuscated instructions internally hiding the sensitive data;

using the set of obfuscated instructions to transform the unprotected computer program P into a protected, obfuscated computer program P' that is accepting of the secret polynomial points, wherein the set of obfuscated instructions non-malleably obfuscates all sparse functions, given access to the random oracle; and writing, by the one or more processors, the obfuscated computer program P' to a non-volatile computer-readable medium, wherein the obfuscated computer program provides a virtual black box guarantee, preventing an adversary from learning anything about the sensitive data.

14. The computer program product as set forth in 13, further comprising instructions for causing the one or more processors to further perform an operation of preventing an adversary from learning the secret polynomial points.

15. The computer program product as set forth in 14, further comprising instructions for causing the one or more processors to perform an operation of preventing an adversary from modifying the obfuscated computer program P' to another re-obfuscated computer program.

16. The computer program product as set forth in claim 15, further comprising instructions for causing the one or more processors to perform an operation of evaluating the obfuscated computer program P' with an input, wherein if the input is one of the secret polynomial points, then the obfuscated computer program P' will be evaluated to output 1, and 0 otherwise.

17. The computer program product as set forth in 13, further comprising instructions for causing the one or more processors to perform an operation of preventing an adversary from modifying the obfuscated computer program P' to another re-obfuscated computer program.

18. The computer program product as set forth in claim 13, further comprising instructions for causing the one or more processors to perform an operation of evaluating the obfuscated computer program P' with an input, wherein if the input is one of the secret polynomial points, then the obfuscated computer program P' will be evaluated to output 1, and 0 otherwise.

* * * * *